United States Patent [19]

de Olano

[11] Patent Number: 5,367,122
[45] Date of Patent: Nov. 22, 1994

[54] ORNAMENTAL ELECTRICAL MOLDING

[76] Inventor: Luis A. R. de Olano, P. DeLedesma No. 1733 (5000), Cordoba, Argentina

[21] Appl. No.: 711,874

[22] Filed: Jun. 7, 1991

[51] Int. Cl.$^5$ ............................ H02G 3/26; H01B 7/04
[52] U.S. Cl. .................................. 174/48; 174/117 F; 174/117 A; 174/133 R
[58] Field of Search .............. 174/48, 49, 101, 117 R, 174/117 F, 117 A, 133 R, 133 B

[56] References Cited

U.S. PATENT DOCUMENTS

| | | |
|---|---|---|
| 1,984,356 | 12/1934 | Abbott . |
| 2,413,032 | 12/1946 | O'Brien ............................ 174/48 X |
| 2,701,819 | 2/1955 | Hirtle . |
| 2,831,049 | 4/1958 | Cabral . |
| 3,253,085 | 5/1966 | Stern . |
| 4,602,124 | 7/1986 | Santucci ............................ 174/101 |

Primary Examiner—Leo P. Picard
Assistant Examiner—D. A. Tone

[57] ABSTRACT

An ornamental electrical molding comprising a body made up of flexible and moldable insulating material, where tubular conductors made up of helically wound wire are located. The molding is covered on its bottom face by a plastic foam strip coated with contact adhesive, and permits—together with a set of fittings assembled to each other—the performance of exposed surface installations quickly, easily and decoratively. The body that houses the wire conductor tubes has a double function, as insulator and as the frame for ornamental designs.

4 Claims, 1 Drawing Sheet

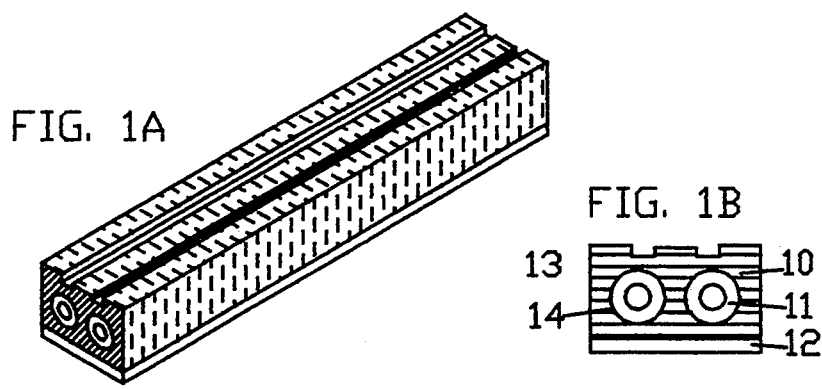
FIG. 1A
FIG. 1B
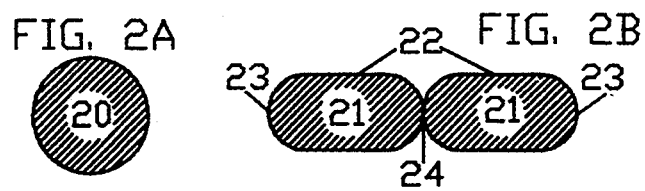
FIG. 2A  FIG. 2B
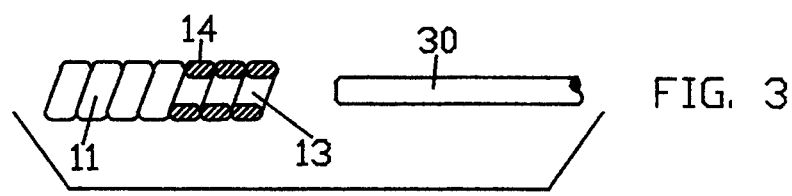
FIG. 3
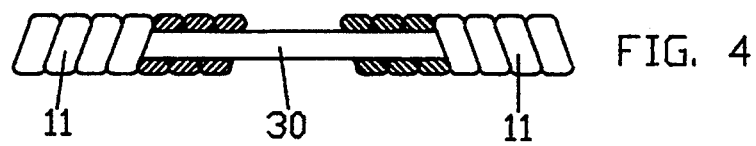
FIG. 4
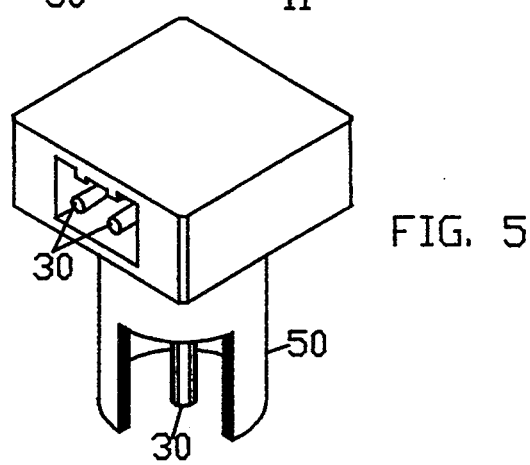
FIG. 5
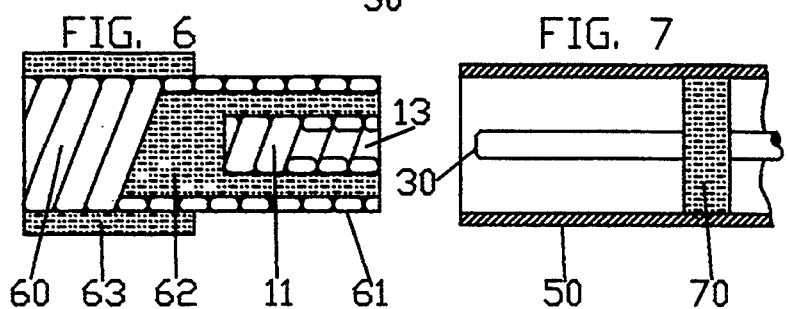
FIG. 6  FIG. 7

ORNAMENTAL ELECTRICAL MOLDING

TECHNICAL FIELD

This invention relates to electrical current conductor systems and, in particular, to a surface conductor system having self-affixing means, adapted to exposed installation on pre-existing structures or for applications where frequent changes are contemplated.

BACKGROUND ART

Modem life's demands bring about changes in the space configuration of buildings. New needs arise that the existing installations in buildings cannot meet and therefore lead to the use of accessory installations exposed on the surface. The existing systems with self-affixing means attempting to solve the above mentioned problem may be classified into two groups: a) surface conductors and b) cable carry ducts.

When considered as a whole, the systems above, obviously contemplate many of the problems posed by this kind of installation. However, when individually analyzed, they show inherent design limitations that leave a great deal of the problems unsolved.

For example, some systems whose conductors are wires, are flexible enough to suit various surface types, yet they cannot be easily spliced, which hampers the use of fittings. Examples: Cabral, U.S. Pat. No. 2,831,049; Stern U.S. Pat. No. 3,253,085; Hirtle, U.S. Pat. No. 2,701,819.

Other systems using rigid tubes as the electrical current conductor element may be relatively easily assembled by using connecting pins; however, the tubes' own rigidity prevents them from adapting to irregularly shaped surfaces. Such is the case of O'Brien, U.S. Pat. No. 2,413,032, who presents a continuous metallic tube requiring certain rigidity to perform its function; that rigidity becomes a problem in other senses. For example, contact reliability is little, since there is little tolerance allowed to achieve good adjustment between the connecting pin and the rigid tube. Therefore, a slight difference may impair contact between elements. Rigidity is a problem too in, cable carrying ducts, Santucci's, U.S. Pat. No. 4,602,124 which are extremely rigid on account of their double "U-shaped" structure (base and cover) which makes it impossible to adjust a channel with a section of that shape to a curved surface, for example. That same structure composed of double sidewalls made up of U-shaped channel and U-shaped channel cover sidewalls) is ugly and takes up space. In addition, it features superfluous insulating material in excess of the insulation provided in the cables that are carried.

The rigidity of systems with both rigid tubular conductors (O'Brien) and cable-carrying ducts (Santucci) complete the manufacturer to provide short lengths, which increases the number of cuts and splices, thus deteriorating the aesthetic aspect of the installation. Cable-carrying ducts are extremely useful for industrial applications, where it is necessary to protect and systematize installation of conductors, paying little attention to the aesthetic aspect. However, they do not solve the aesthetic/functional problem of urban uses, where the decorative aspect is important.

The above mentioned, already existing systems, do not provide a solution to the problem posed by the need to penetrate a wall or partition wall in order to extend installation from one room into another. In contrast, the system proposed herein makes it possible to extend installations from one partition's side into the other by combining conductors located concentrically and in juxtaposition through the use of an interconnecting plug.

SUMMARY

This invention relates to an ornamental electrical molding, the central element of an assembly made up of, in addition, connectors to facilitate unions and fittings intended for expanding their specific functions, all of them capable of being assembled to each other and with self-adhesive properties. The objects of this invention are the following:

1—To Provide Multiple Functional Alternatives

The interconnecting feature of this molding permits, through connecting pins, adapting a great number of electrical fittings such as outlet, switches, fixtures, telephone or data jacks, etc.

2—To Provide Varied Ornamental Possibilities

The body of the molding, extruded from moldable, insulating material may assume different shapes, textures and colors, allowing a great variety of ornamental designs.

3—To Achieve Total Adaptability to Any Surface Shape

The way in which the turns that make up the conductor tubes, pivot on each other, added to the great flexibility achieved by the PVC type flexible material of the body, permits complex installations on columns or circular section pipes.

4—To Permit Adherence to a Great Variety of Surfaces

The double sided adhesive strip provided on the base of the molding permits its adhesion to various surface types such as wood, glass, marble, iron, cement or masonry, without deteriorating the surface when removed.

5—To Facilitate Extension Through Walls or Partitions Wall

The possibility of combining moldings of juxtaposed and concentric conductors, by using an interconnecting plug, allows extension of an installation from one side of a partition wall into the other.

6—To Ensure Good Contact

The clamping effect generated by tension resisting expansion of each turn in the conductor tube enables the introduction of a pin that is properly adjusted thus achieving excellent contact on the flat faces of the wire forming the conductor tubes.

7—To Facilitate Cutting to Measure

Discontinuity of the tube made up of wire, allows using a cutting element, to separate turns without crushing the tube by only cutting the wire with which it is made.

8—To Allow Easy Assembly

Cutting convenience, simplicity of connection to fittings, speed of installation and quick adjustment to any shape provide for easy and fast assembly without previous experience.

9—To Achieve Aesthetic Symmetry

The possibility of shaping the molding body into any format allows manufacturing an identical molding without conductors in order to achieve symmetry effects in decorative work.

10—To Reduce Splicing

The great flexibility of this molding and the capability of changing its shape enable the manufacturer to provide it in rolls of several meters, which avoids splicing required by products sold in short lengths on account of their rigidity.

11—To Integrate Complementary Functions

If the body is manufactured from self insulating material such as PVC, "chair guard current conducting moldings" may be made. These will perform their electrical function while also absorbing the shocks that a chair guard usually bears without being deteriorated, thus adding to their electrical function a practical and ornamental function.

DRAWINGS

FIG. 1 shows a perspective view (FIG. 1A) and cross section of the electrical molding. (FIG. 1B)

FIG. 2 shows cross sections of both a round wire (FIG. 2A) and two turns of the same wire after being flattened and wound. (FIG. 2B)

FIG. 3 shows a length of a helically wound wire tube with a longitudinal section and a male connecting pin.

FIG. 4 shows the union of two lengths of wire conducting tube interconnected by a male pin.

FIG. 5 shows an interconnecting plug used to connect a juxtaposed conductor molding with a concentric molding with a concentric conductor molding.

FIG. 6 shows a longitudinal section of a molding with two concentrically located conductors, where cross sections of the wires that make up the internal and external conductor turns may be seen, as well as the insulating material that separates them and houses the assembly.

FIG. 7 shows a longitudinal section of a male/female connector for connecting concentric conductor moldings.

DESCRIPTION OF THE PREFERRED EMBODIMENT

The essential element of this invention is what has been called ornamental electrical molding, the component characterizing the assembly since connectors as well as fittings are complements of the molding, not inventions. As mentioned above, the molding (FIG. 1B) is made up of a body (10) of soft and flexible material, performing a double function as insulator and "body" which will assume the desired decorative shape. Conducting elements are inserted in this insulating body: metal tubes (11) made of helically wound wire for carrying electricity and, on the bottom face of the body, a plastic foam strip (12) coated with adhesive on two sides, one of which is protected by a tape before use. The assembly is built by simple extrusion of insulating material shaped in accordance with a design. Wound wire tubes are then incorporated. Wire conductors are made on a spring-making machine and should undergo a previous rolling process for flattening the circular section wire.

With the tubes acting as conducting elements proper, the molding becomes a single or multipolar cable.

These conducting tubes have certain characteristics that define their advantages:

a) Because of their shape they can make contact both from the internal cavity (13) through a male pin (30) and from the external area through a female pin (50).

b) Another advantageous feature is that when there is more than one conductor, each one can be located in juxtaposition (FIG. 1A and FIG. 1B) or concentrically to each other (FIG. 6). This construction possibility gives rise to two different types of molding:

1—Juxtaposed Conductor Molding (FIG. 1A and FIG. 1B);

Wire tubes are placed next to each other and interconnected between different lengths of the molding or to fittings through male pins (30).

2—Concentric Conductor Molding (FIG. 6)

This is built by winding a new wire tube (60) over a smaller tube (11) covered with the insulating material (62) separating one conductor from the other, and covering both again with insulating material (63). The result is a bi-polar cable where conductors are two concentrically wound wire tubes. This molding is interconnected by using a male/female pin (FIG. 7) where the male pin (30) contacts the inner face of the internal tube (13) and the female pin (50) contacts the outer face of the external tube (61), both being separated by insulating material (70).

This double manufacturing alternative provide a solution to a problem that the other systems fail to solve: penetration through (walls, partition walls, etc.). The juxtaposed conductor molding allows performing most surface installations. Where it is required to cross a partition wall, the concentric molding is necessary. A simple hole is drilled on the wall or partition wall, the proper length of the molding is then introduced in the hole and the latter is covered on both sides by an interconnecting plug (FIG. 5). Thus, the installation on one side of the wall is connected with the one on the other side, through a piece of concentric molding placed in the hole, by means of two interconnecting plugs fitted at the ends of the moldings.

c) Another feature is the clamping effect. Each turn of the wire making up the conductor tube (11) functions as a spring resisting expansion, which permits forcing taper pins (30) where the highest diameter should be slightly greater than the interior of the conductor tube. This will expand the tube turns and strongly clamp the pin, thus increasing contact safety.

d) These conductor tubes may be manufactured with various types of wire, of different shapes and cross section sizes.

Basically, the cross section of the wire in the tubes may be:

1—Circular (FIG. 2A)
2—With two flat faces (FIG. 2B)
3—With four flat faces
4—Other

EXAMPLE

1—When the wire has a circular cross section (FIG. 2A), the tube will be internally threaded enabling the introduction of a pin with a slight thread of the same pitch as the tube's thread. This will prevent the pin from disconnecting.

2—If the wire has a circular cross section and has been previously flattened (FIG. 2B) it will have two flat faces (22) which, when the wire is wound, will become the inner (13) and outer (14) faces of the tube. This provides the conductors with a large contact surface inside and outside, where male and female pins will be adjusted. When flattened the circular section wire, two semicircular faces (23) emerge which, when the tube is built, touch each other (24). This provides the conductors with great flexibility due to the pivoting effect hereinafter described.

3—If the wire has four flat faces, in addition to featuring good contact surface in the inside and outside of the tube, the contact between turns is increased, which increases the electrical conductivity of the tube.

e) Pivoting Effect. This is a particular feature of conductor tubes built with circular section wire (FIG. 2A) or flattened circular wire (FIG. 2B), where the faces of every turn touching each other in the tube have a semi-circular shape (23). In this case, as shown in FIG. 2B, when the conductor tube bends, the inflection point (24) lies on a couple of cylinders working one on the other, which gives the tube great flexibility and enables it to adapt itself to any shape without keeping a definite state. Thus, it can adopt any shape as long as it may be necessary.

f) Another important characteristic is the dicontinuity of the conductor tube (11). This facilitates cutting without deteriorating the tube since the blade of the cutting element separates the turns and cuts a wire, not a tube. Thus, the molding can be cut to a desired size without distorting the inner cavity of the conductor.

Having described and established the nature and scope of the present invention and the way in which it should be implemented, it will be understood that modifications and variations may be effected without departing from the spirit of the invention.

I claim:

1. An electrical conductor unit for mounting on an exposed surface, said unit comprising an ornamental molding of flexible electrically insulating material, an electrically conductive tube of helically wound wire, said tube being located within said molding, and means on said molding for affixing said molding to the exposed surface.

2. An electrical conductor unit as claimed in claim 1 wherein said means is an adhesive material.

3. An electrical conductor unit as claimed in claim 1 wherein a plurality of said tubes are provided in juxtaposition to each other.

4. An electrical conductor unit comprising a first electrically conductive tube of helically wound wire, a first layer of flexible electrical insulation surrounding said first tube, a second electrically conductive tube of helically wound wire surrounding said first layer of insulation, said second conductive tube being located concentrically with respect to said first conductive tube, and a second layer of flexible electrical insulation surrounding said second tube.

* * * * *